US006791451B1

(12) United States Patent
Muise et al.

(10) Patent No.: US 6,791,451 B1
(45) Date of Patent: Sep. 14, 2004

(54) SYSTEM AND METHOD FOR IMPROVING THE SECURITY OF STORAGE OF FIREARMS AND OTHER OBJECTS, AND FOR AIDING THE RECOVERY OF SUCH IF REMOVED FROM STORAGE

(76) Inventors: Christopher Russell Muise, 26 Campmeeting Rd., Topsfield, MA (US) 01983; John Charles Holt, 204 Jewett St., Georgetown, MA (US) 01833; Daniel Grant Thomas, 360 Winter St., North Andover, MA (US) 01845

( * ) Notice: Subject to any disclaimer, the term of this patent is extended or adjusted under 35 U.S.C. 154(b) by 432 days.

(21) Appl. No.: 09/653,232

(22) Filed: Aug. 31, 2000

(51) Int. Cl.[7] .................................................. H04Q 5/22

(52) U.S. Cl. ................ 340/10.1; 340/10.3; 340/825.69; 340/825.72; 340/539.1; 340/539.3; 42/70.11; 379/40

(58) Field of Search .............................. 340/10.1, 10.3, 340/10.42, 5.33, 825.69, 825.72, 539.1, 539.3; 379/40, 45, 37; 42/70.01, 70.11

(56) References Cited

U.S. PATENT DOCUMENTS

| | | | | | |
|---|---|---|---|---|---|
| 5,357,254 | A | * | 10/1994 | Kah, Jr. | 342/42 |
| 5,416,826 | A | * | 5/1995 | Butler | 379/40 |
| 6,150,921 | A | * | 11/2000 | Werb et al. | 340/10.1 |
| 6,226,913 | B1 | * | 5/2001 | Haimovich et al. | 42/1.01 |
| 6,282,829 | B1 | * | 9/2001 | Mossberg et al. | 42/70.11 |
| 6,429,769 | B1 | * | 8/2002 | Fulgueira | 340/5.33 |
| 6,492,905 | B2 | * | 12/2002 | Mathias et al. | 340/540 |

* cited by examiner

*Primary Examiner*—Michael Horabik
*Assistant Examiner*—Vernal Brown
(74) *Attorney, Agent, or Firm*—Rines and Rines

(57) ABSTRACT

A novel technique and system for improved monitoring of the storage security of firearms (and other objects) and, through a microprocessor radio-controlled transceiver embedded within the firearm, enabling detection of theft or removal, and then radio-tracking of the stolen firearm by police or others with continual identification of that firearm, and also with the further feature of providing automatic warning to schools or other public buildings or locations of the intrusion in their vicinity of a bearer carrying the stolen firearm.

12 Claims, 6 Drawing Sheets

Base Unit (Rear View)

SYSTEM AND METHOD FOR IMPROVING THE SECURITY OF STORAGE OF FIREARMS AND OTHER OBJECTS, AND FOR AIDING THE RECOVERY OF SUCH IF REMOVED FROM STORAGE

FIELD OF INVENTION

The present invention relates to automatic systems and techniques for improving the security of the storage of firearms and other object, more generally, that either are dangerous in unauthorized hands or are valuable to the owner or custodian; and also to aiding in the tracking and recovery of such if unauthorizedly removed from, or not appropriately returned to, such storage—and, additionally, to alerting schools and other locations automatically of the approach of an intruder with the stolen firearm.

BACKGROUND

The art is replete with techniques for monitoring the securing or storage or location of objects of varied types, and for detecting and providing an alarm upon the withdrawal or removal of such objects from their intended location or repository. Examples of varied radio-wave system monitoring applications are described in U.S. Pat. Nos. 4,818,998 and 5,917,423 for recovering stolen vehicles, the so-called LoJack® systems; in U.S. Pat. Nos. 4,804,943, 5,680,105 and 5,686,892 for items of personal property; and in U.S. Pat. Nos. 5,805,105, 5,183,951 and 5,852,401, relating generally to radio beacon and similar location systems.

A primary application of interest in connection with the present invention, however, is the before-mentioned security of firearms, and the addressing of the growing concerns of firearm theft and gun violence. The legitimate gun owner is seldom the one most likely to commit an act of violence with a firearm. It is their stolen firearms, however, that end up in the hands of those who commit crimes against society. It has become a fact of a gun owner's life that if his or her firearms are indeed stolen and used to commit a crime, they can be held responsible. There have been attempts in the past, accordingly, to tie the gun owner's vault to a security system and patented examples of such systems will be later detailed. While effective in varying degrees, such systems do not address the problem of locating the stolen firearms. If, indeed, a burglar knows that a house is equipped with a security system, usually the first order of business is to disable it. If a thief has already disarmed the security system, the system attached to the firearms vault is generally disabled also. There then remains the problem of locating the stolen weapons afterwards. If the gun owner's house is in a remote region, it will take law enforcement officials a long time to get there even if the security system does work. Theoretically the police could pass the fleeing suspect on their way to the crime, never knowing it was the thiefs.

The system of the present invention, therefore, has been designed to address not only improved security, but also the recovery of the stolen firearms, providing the police with information, for example, that a stolen gun is in a stolen car that they are about to approach.

The invention is not, however, the first approach to the use of radio-wave monitoring and alarm systems to warn of the removal of a firearm from its stored location or repository; such being addressed, for example, in U.S. Pat. Nos. 3,530,451, 5,196,827, 5,416,472, 5,525,966 and 5,598,151, and a tie-in with security and central alarm systems has also previously been proposed, as in, for example, U.S. Pat. Nos.

5,416,472, 5,821,855, 5,828,301 and 5,841,346. Inventory checking and control has also been proposed as, for example, in U.S. Pat. Nos. 5,786,764 and 5,798,693.

None of these approaches , however, provides adjustable for the security monitoring and identifying of the firearm in its intended storage facility or repository, but, in the event of failure to intercept the breach of security at the storage facility, none provides continuing identification tagging and tracking thereafter of a transceiver-equipped stolen firearm, including during the police efforts to recover the stolen firearm; and none provides for the security of a school or other building in automatically detecting the approach of such a stolen firearm to their premises.

OBJECTS OF INVENTION

It is accordingly a principal object of the invention to provide such a new and improved method of and system for securing firearms in their storage facility or repository; and, if unauthorizedly removed therefrom, enabling continuing tracking, for ultimate recovery thereof with identification of that particular firearm, and, in addition, to provide automatic warning to a school or other building or location of the approach of the stolen firearm upon its premises.

A further object is to provide such a novel system for identifiably tracking and/or alerting to the approach of other stolen or otherwise removed objects, as well.

Other and further objects will be explained hereinafter and are more particularly delineated in the appended claims.

SUMMARY

In summary, however, and in connection with the firearm application of the invention, the invention embraces a method of monitoring the security of stored firearms and the like and enabling the tracking of their unauthorized removal, that comprises, embedding within each firearm a battery-operable microprocessor-controlled radio transmitter-receiver transceiver, normally quiescent when the firearm is properly stored, and code-identified for the particular firearm; monitoring the storage of the firearms, upon detection of an unauthorized removal of a firearm from storage, enabling the police or other tracking of radio transmissions from the transmitter of the transceiver, so code-identified; and equipping schools, public buildings and other locations with receivers responsive to said radio transmissions for providing an automatic warning to them of the approach of the stolen firearm, as by a bearer, in the vicinity of such a location.

Preferred and best mode designs and implementations of the invention are later detailed.

DRAWINGS

The invention will now be explained in connection with the accompanying drawings, FIG. 1 of which is a block system diagram illustrating both in-range police tracking and out-of-range operation of the specifically microprocessor-controlled-transceiver equipped stolen firearm of the invention;

FIG. 2 is a combined front-panel keyboard and control diagram and schematic block circuit and function diagram of the basic unit of the system of the invention, as designed for use in, for example, a police tracking vehicle, and with a transceiver link to the firearm and a cellular phone link to the police vehicle; and with FIG. 2B illustrating the portable character of the same as a rear view, upon a smaller scale;

PREFERRED EMBODIMENT(S) OF INVENTION

Figure 2A:
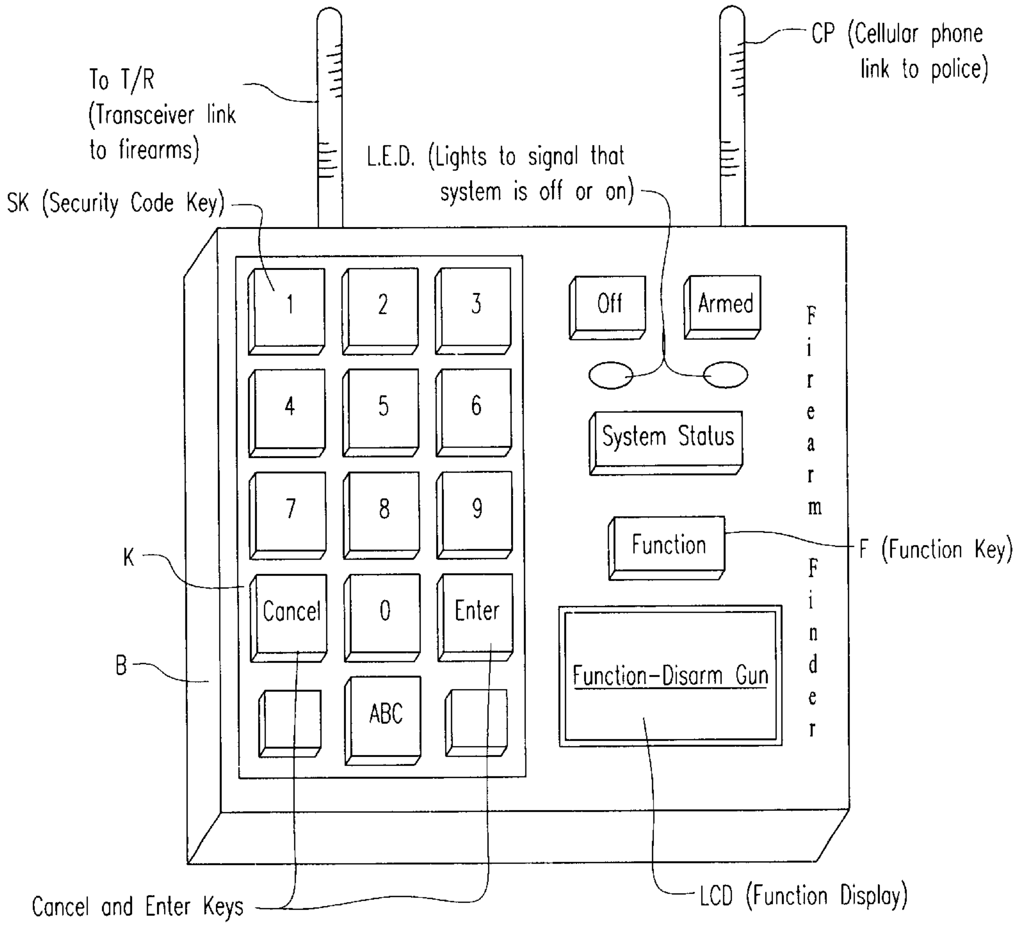
Figure 3B:
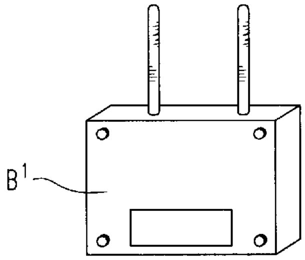
FIGS. 3A and 3B are similar to FIGS. 2A and 2B, but illustrate a basic unit designed for use in, for example, a building to be protected from intrusion with the stolen firearm, and designed with a receiver link to the firearm embedded transmitter.
Figure 3A:
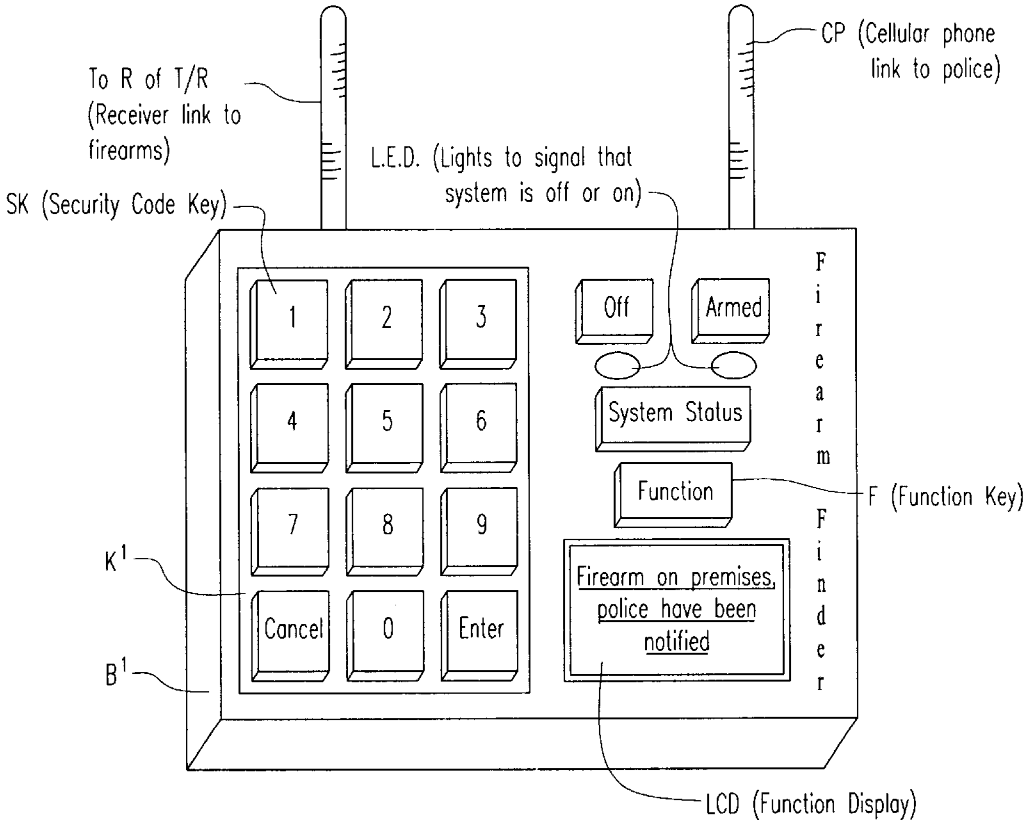
Figure 4:
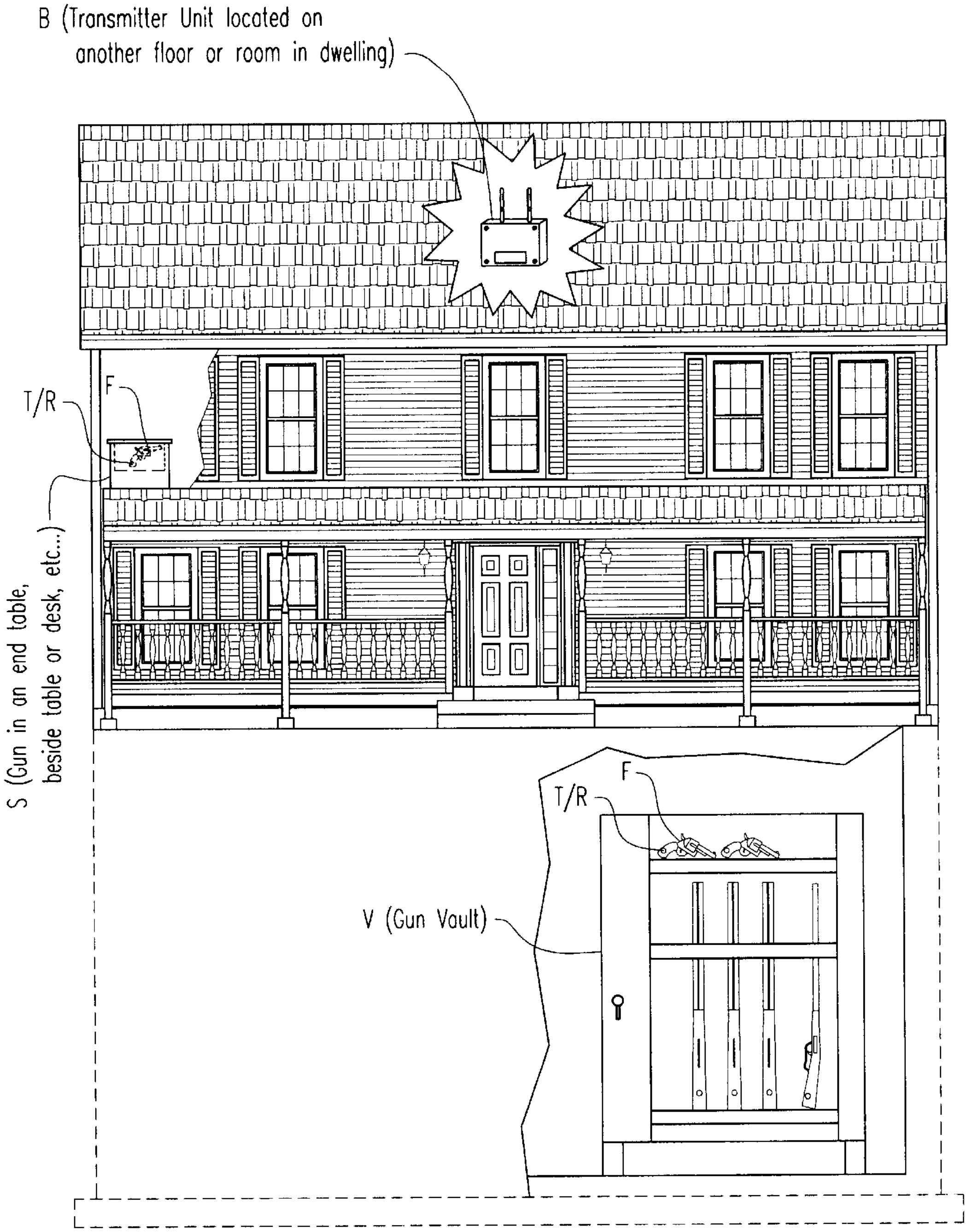
FIG. 4 illustrates the storage of a transceiver-equipped gun within a room of, for example, a house; and, at the bottom right, within a gun vault, with the basic unit of FIGS. 2A and 2B hidden in the house, as in the attic.
Figure 5:
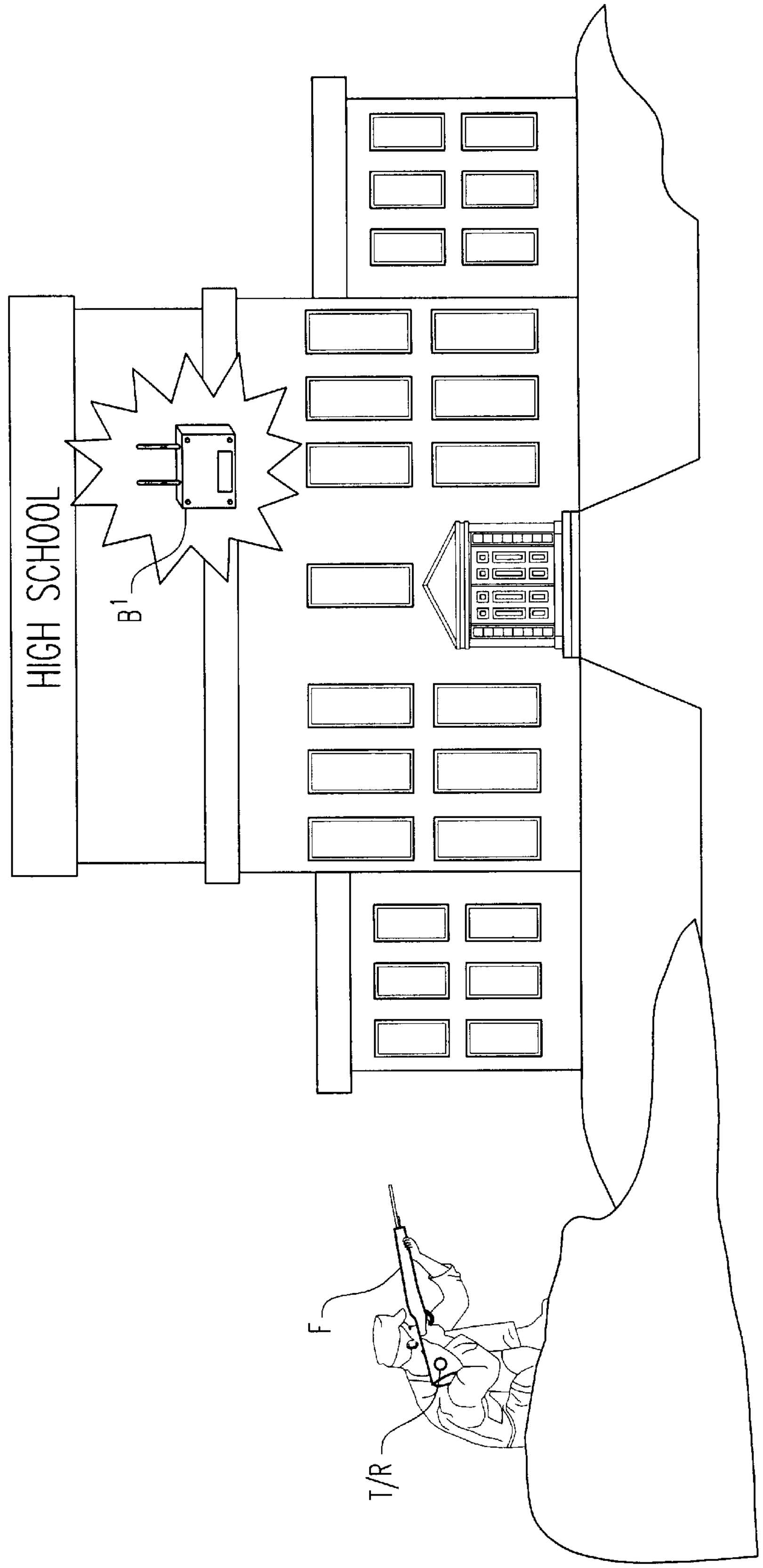
FIG. 5 illustrates the basic unit of FIGS. 3A and 3B disposed within a school or other building or place "on watch" for the approach of a bearer with the stolen gun.

The system and methodology of the invention as applied to the firearm application are primarily designed to be operated solely, or in conjunction with, an existing home, office, business or other security system. The system has three basic components: a transceiver T/R, FIG. 1, embedded in the firearm F as later described; a base unit B, FIG. 2A; and a unit for schools and or public buildings, $B^1$, FIGS. 3A and 5. The base unit B would be installed in a concealed or secret location in the house (i.e. attic, garage or basement), preferably away from the gun vault or gun storage area S, as shown in FIG. 4. This would be first and foremost to keep the intruder from knowing about the transceiver-equipped firearms. Secondly, it allows the system to be secured separately to avoid and prevent the unauthorized use of the gun by someone in the household. The transceiver portion T/R is a unit that would embedded, for example, in either the handgrip of a handgun or the stock of a rifle, as shown at T/R an d FIGS. 1,4,5 and 6. While the concept of disposing electronic devices in gun handgrips is broadly not new (as in U.S. Pat. Nos. 4,936,037, 4,996,787 and 5,479,149); the invention novelly embeds the quite different transceiver of the invention for use in the specific system thereof.

The base unit has the following functions;

1. Enters a security code function at SK in FIG. 2A by the authorized party prior to any changes being made to the system,
2. The keypad K allows (a) the entering of the firearm identification number and description, i.e. Ruger 44 caliber ID# 12345678; (b) adjusting the distance of the zone of security from the base unit (such as by the technique of U.S. Pat. No. 5,812,056) from hundreds of feet to a few feet, temporarily to permit the gun owner to remove the firearm from storage and clean or use it within a preset distance from the system—and (c) allowing the authorized user to lock and/or unlock a selected firearm from storage—all with well-known microprocessor software operations.
3. The system has a cellular phone system CP to thwart criminal attempts to override the security system by cutting the phone lines prior to entering the dwelling.
4. Keeping an on-going inventory of all stored firearms (LED on-off lights are provided, so labeled) as on a random basis, by asking if, for example, is Ruger 44 caliber ID #12345678 in the cabinet? If the system gets a positive response it will go on to the rest of the inventory. If, however, it does not receive a positive response, it may ask again and then contact the police as later explained in connection with FIG. 1. In the event of a theft contact, the police may be given a verbal list of such information as name, address, what has happened, and most importantly, a list of the firearms that have been removed from the location without authorization. (Also an approximate amount of ammunition normally stored on the premises).

Figure 1:
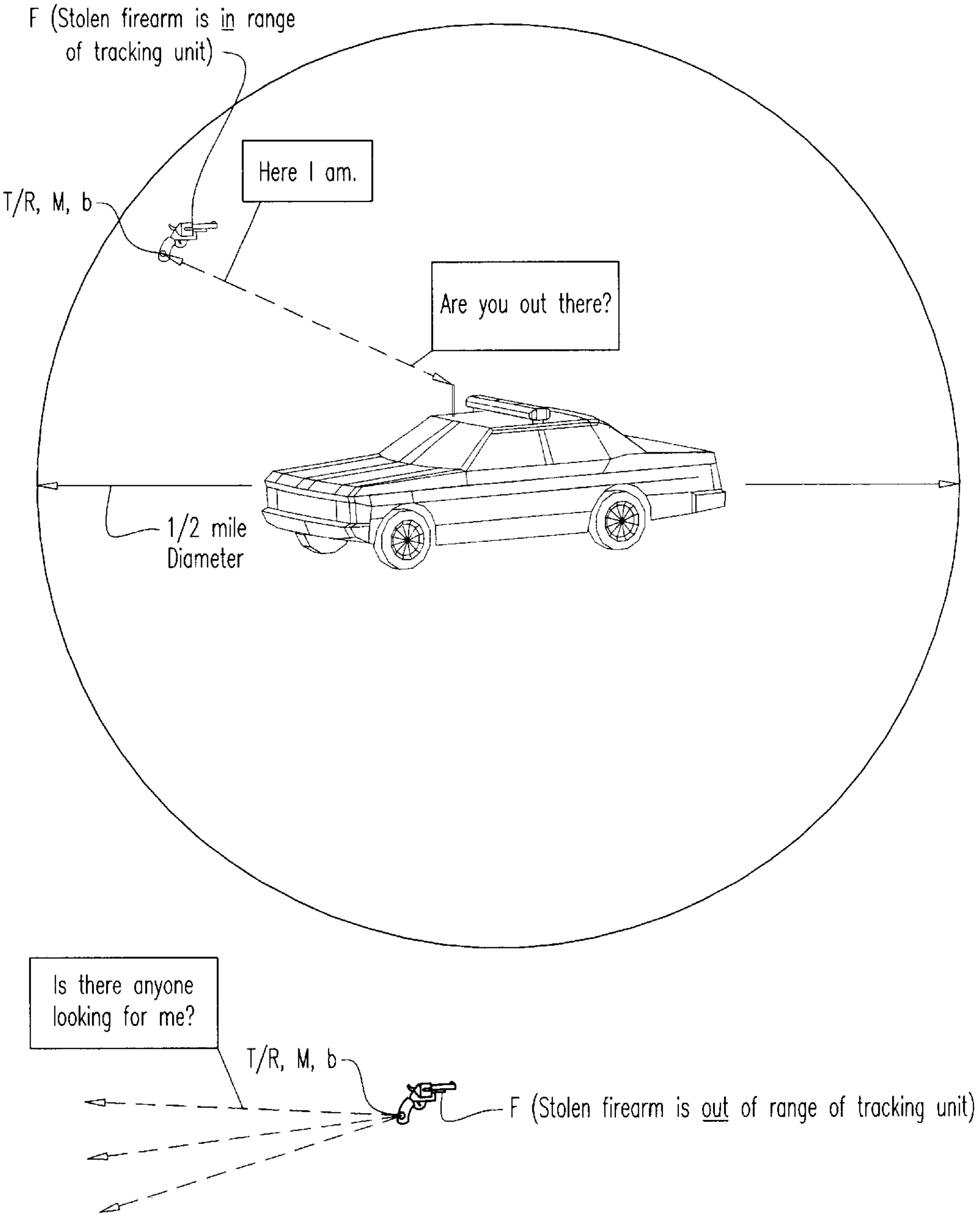

Considering now, the operation involving the invoking of police assistance upon detecting a security break by the disappearance of a stored firearm, a police/car with well-known direction-finding receiver equipment, tuned to the frequency of the firearm-equipped transceiver transmitter, will use the transmissions as a tracking signal. This is illustrated at the top of FIG. 1. The removal of the firearm from storage, indeed, may set the transceiver transmitter T into periodic transmission, even out of range of any police tracking unit, as shown at the bottom of FIG. 1; and/or when in-range, the transmissions of the transceiver may be triggered by police interrogation (similarly to the operation of said U.S. Pat. No. 4,818,998, for example), and may then be used as the tracking signal, with continued identification code for the particular stolen firearm. This may also be used to complement the present-day LoJack® type stolen vehicle recovery systems, as well.

Turning to the before-described microprocessor-controlled (M, FIG. 1) transceiver component T/R of the system of the invention, this may today readily be manufactured in approximately the size of a dime, and is equipped with a replaceable watch-style miniature battery b. The characteristics of this portion of the system are to allow for the above-described tracking of the stolen firearm as follows.

The microprocessor M will remain in a semi-dormant state while in storage, thus extending the life of the battery b, FIG. 1. The only energy used by the microprocessor will be to respond to the before-described inventory function of the base unit B as it maintains a list of the firearms in storage. This will only require a microburst of energy as taught, for example, in U.S. Pat. No. 5,812,056. The microprocessor will come awake when an unauthorized person removes the firearm from storage.

The microprocessor M will remain in a semi-dormant state after the firearm F is stolen, and the only function that will occur, will be the listening function of the receiver portion R of the embedded transceiver T/R. This will allow the microprocessor to listen for the police tracking unit. Once it receives the call signal from the police tracking unit, in may begin to transmit or broadcast its signal. The frequency that the transceiver will broadcast on, can be the same as that of the before-mentioned LoJack® system, with the transmitter T of the invention sending a distinct signal characteristics so as not to be confused with stolen car signals. This will allow police to track a stolen gun using the systems that are currently in use for tracking stolen cars. Once the police unit is out of range, however, the system may revert to the before-described dormant state, thus preserving the battery.

As before explained, the microprocessor M will be able to encode information relative to identification of that particular firearm. This will be accomplished by pressing the base unit function key F, FIG. 2A, and selecting "add new item to inventory". The base unit then encodes the microprocessor with the information while at the same time it adds it to the base unit inventory list. Each transceiver has a serial number which can be used to provide an identifiable firearm by the system.

The system, moreover, can automatically notify the gun owner if the battery b is getting weak. This can be done during the inventory functions of the system. If a unit is getting weak and needs replacement, the system phone unit can automatically, in wellknown manner, call a preset number (that of the gun owners, for example) and inform the owner of the need to replace the battery. The main display of the control unit (LCD, FIG. 2A) will display which unit needs to be replaced.

Figure 6:
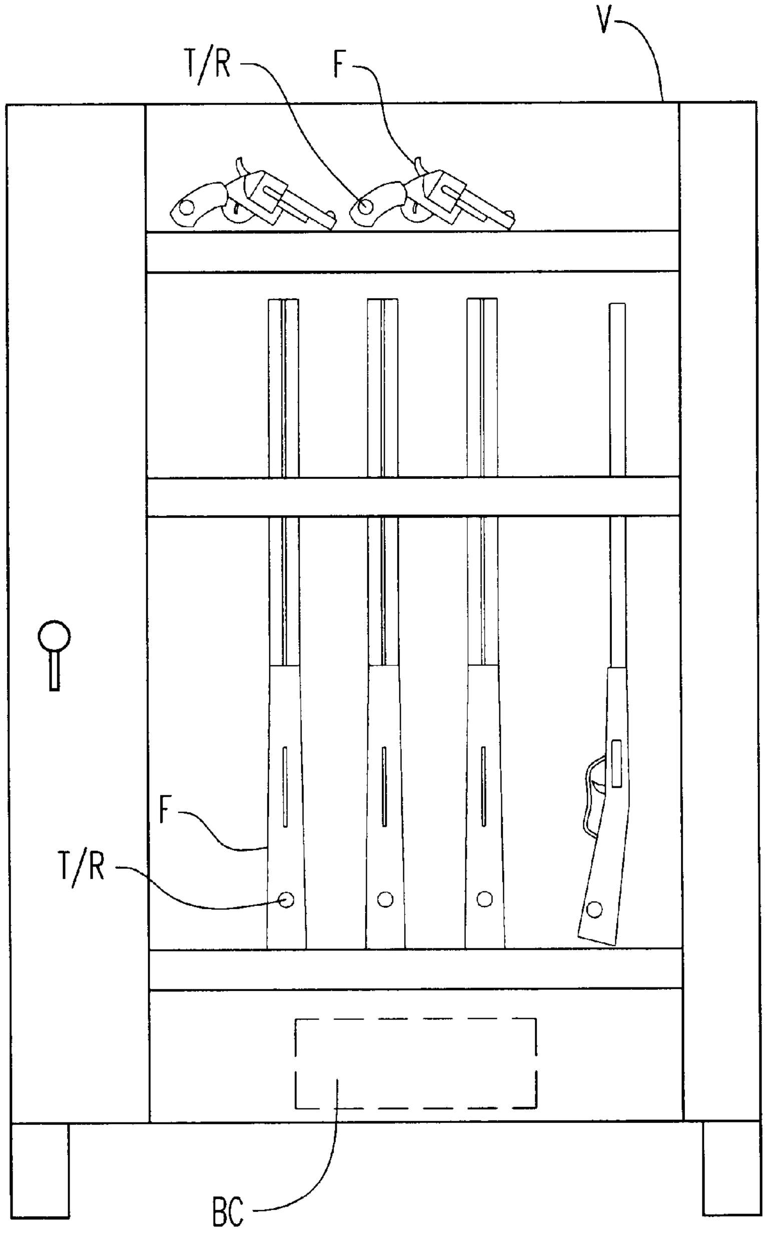
FIG. 6 is a view, upon an enlarged scale of the vault of FIG. 4, illustrating the use of a field-effect battery charger at the gun rack to maintain battery charge in the transceivers embedded in the firearms.

If desired, while the transceiver-equipped firearms are in their storage rack or vault V, FIGS. 4 and 6, they may be subjected to field-energizing charging BC, FIG. 6, to extend the transponder unit battery life.

Figure 2B:
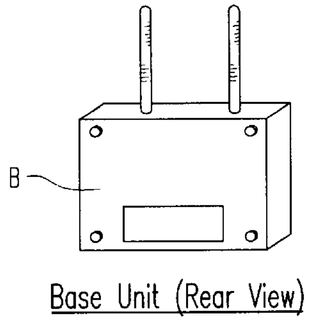

As before discussed, a further important feature of the invention resides in the automatic alerting of a school or other public building or location of the approach of an intruder bearing the stolen transceiver-embedded firearm. This is shown effected in FIG. 5 with the installation of the base unit $B^1$ of FIGS. 3A and 3B, similar in configuration to, but modified from the base unit of FIGS. 2A and 2B. The base unit $B^1$ has a keypad $K^1$ to allow the setting and resetting of the system. Again, a cellular telephone link CP is provided for communicating with the local police. Preferably, the receiver and cell phone antennas are coupled, as by coaxial cable, to antennas externally mounted on the building structure and appropriately configured to receive over the necessary area surrounding the building. As in the case of the base unit B of FIG. 2A, the LED display can show, among other functions, system activation, breach of security zone by an intruder approaching with the stolen transceiver-equipped firearm F, and/or notification of the police.

Further modifications will also occur to those skilled in this art, such being considered to fall within the spirit and scope of the invention as defined in the appended claims.

What is claimed is:

1. A method of monitoring the security of stored firearms and enabling the tracking of their unauthorized removal, that comprises, embedding within each firearm a battery-operable microprocessor-controlled radio transmitter-receiver transceiver, normally quiescent when the firearm is properly stored, and code-identified for the particular firearm; monitoring the storage of the firearms; upon detection of an unauthorized removal of a firearm from storage, enabling the police or other tracking of radio transmissions from the transmitter of the transceiver, so code-identified; and equipping schools, public buildings and other locations with receivers responsive to said radio transmissions for providing an automatic warning to them of the approach of the stolen firearm, as by a bearer, in the vicinity of such a location.

2. The method of claim 1 wherein, during storage, the transceiver of each firearm is periodically interrogated to verify its continued presence in the stored inventory of firearms.

3. The method of claim 1 wherein, following detection of the removal of a firearm, the police are notified on a secure channel.

4. The method of claim 3, wherein, in tracking, the police send interrogating signals to the transceiver to trigger transmissions therefrom to identify and locate the location of the removed firearm.

5. The method of claim 1 wherein the range of transceiver transmission is pre-set by the microprocessor, either for police tracking range, or for the extent of said vicinity around said location.

6. The method of claim 5 wherein said range is temporarily reduced to permit authorized removal or handling of the firearm.

7. A system for monitoring the security of stored firearms and enabling the tracking of their unauthorized removal, having, in combination, means for embedding within each firearm a battery-operable microprocessor-controlled radio transmitter-receiver transceiver, normally quiescent when the firearm is properly stored, and code-identified for the particular firearm; means for monitoring the storage of the firearms; means operable upon detection of an unauthorized removal of a firearm from storage, for enabling the police tracking of radio transmissions from the transmitter of the transceiver, so code-identified; and receiver apparatus installed in schools, public buildings and other locations and responsive to said radio transmissions for providing an automatic warning to them of the approach of the stolen firearm, as by a bearer, in the vicinity of such location.

8. The apparatus of claim 7 wherein, during storage, means is provided for periodically interrogating each firearm transceiver to verify its continued presence in the stored inventory of firearms.

9. The apparatus of claim 7 wherein following detection of the removal of a firearm, means is provided for notifying the police on a secure channel.

10. The apparatus of claim 9 wherein the police are provided with tracking means for sending interrogating signals to the transceiver to trigger transmissions therefrom to identify and locate the location of the removed firearm.

11. The apparatus of claim 7 wherein the microprocessor enables the range of transceiver transmission to be pre-set either for police tracking range or for the extent of said vicinity around said location.

12. The apparatus of claim 11 wherein means is provided for temporarily reducing said range to permit authorized removal or handling of the firearm.

* * * * *